(12) United States Patent
Owens et al.

(10) Patent No.: US 7,328,770 B2
(45) Date of Patent: Feb. 12, 2008

(54) STRAP SILENCER

(76) Inventors: Jeffrey A. Owens, 1731 Georgetown Blvd., Lansing, MI (US) 48911; Shantelle L. Owens, 1731 Georgetown Blvd., Lansing, MI (US) 48911; Donald L. Miller, 645 Summit St., Evanston, WY (US) 82930; Susan G. Miller, 645 Summit St., Evanston, WY (US) 82930

( * ) Notice: Subject to any disclaimer, the term of this patent is extended or adjusted under 35 U.S.C. 154(b) by 265 days.

(21) Appl. No.: 11/155,132

(22) Filed: Jun. 16, 2005

(65) Prior Publication Data
US 2006/0283659 A1    Dec. 21, 2006

(51) Int. Cl.
F16F 7/00     (2006.01)
F16F 15/00    (2006.01)
B60N 3/02     (2006.01)
B60R 9/04     (2006.01)
B60R 9/05     (2006.01)
B60J 9/00     (2006.01)

(52) U.S. Cl. ............... 181/207; 181/208; 224/316; 296/180.1; 296/91

(58) Field of Classification Search ............... 181/207, 181/209, 208, 233; 224/316, 309; 296/180.1, 296/91
See application file for complete search history.

(56) References Cited

U.S. PATENT DOCUMENTS

| | | | |
|---|---|---|---|
| 3,296,357 A * | 1/1967 | Greber | 174/42 |
| 3,868,975 A | 3/1975 | Stahl et al. | |
| 4,015,376 A | 4/1977 | Gerhardt | |
| 4,299,305 A * | 11/1981 | Eriksson | 181/230 |
| 4,353,433 A | 10/1982 | Mohrenstein-Ertal et al. | |
| 4,742,944 A | 5/1988 | Iida et al. | |
| 5,282,560 A | 2/1994 | Ozog | |
| 5,294,033 A | 3/1994 | Duemmler | |
| 5,836,643 A * | 11/1998 | Preiss | 296/217 |
| 6,060,142 A * | 5/2000 | Rossini | 428/52 |
| 6,102,265 A | 8/2000 | Stapleton | |
| 6,276,636 B1 * | 8/2001 | Krastel | 244/130 |
| 6,722,544 B1 | 4/2004 | Stephens et al. | |
| 2002/0179228 A1 | 12/2002 | Gibson et al. | |
| 2003/0013818 A1 | 1/2003 | Hakuta et al. | |
| 2003/0234268 A1 | 12/2003 | Kubina et al. | |

* cited by examiner

*Primary Examiner*—Edgardo San Martin
(74) *Attorney, Agent, or Firm*—Advantia Law Group; Michael W. Starkweather; Jason P. Webb

(57) ABSTRACT

There is a noise reduction device for reducing noise from a vibrating strap. There is a securing member including a strip of material having a first surface including hook material and a second surface including loop material, wherein the securing member is configured to removably attach to the vibrating strap by wrapping about the strap and attaching a portion of the first surface to a portion of the second surface. There is a damping member including a plurality of strands of fibers configured to dampen vibratory motion. There is an internal coupling member configured to couple the securing member to the damping member and configured to bundle the plurality of strands of fibers.

14 Claims, 3 Drawing Sheets

STRAP SILENCER

BACKGROUND OF THE INVENTION

1. Field of the Invention

The present invention relates to noise reduction devices, specifically strap noise reduction devices.

2. Description of the Related Art

Often when traveling by vehicles such as cars, people may need additional cargo space for holding bags, supplies, luggage, etc. and may strap these materials to a vehicle. In fact, there are sometimes specialized racks or rails installed on vehicles to facilitate strapping materials to the vehicle, for example a luggage rack on a top of a car. However, straps, such as but not limited to, cords, ropes, wires, lines, etc., used to secure luggage to vehicles may experience movement, such as vibrations, that may result in noise or other undesired sounds. The noise may annoy, distract, disrupt, or otherwise discomfort the occupants of the vehicle; the discomfort may be greatly magnified where the vehicle must travel a great distance.

While automobile manufacturers have developed systems for reducing wind noise caused by sturdy luggage racks, there has been little effort in developing a device to reduce noise from straps used to couple objects to a vehicle's rack. Further, the specially designed luggage racks offer no solutions for a plurality of vehicles, only to the vehicle to which the luggage rack is attached during manufacturing. Therefore any benefits of using a particular luggage rack system are locked into the particular vehicle, thereby creating a very expensive solution.

What is needed is a device for solving one or more of the problems mentioned herein.

SUMMARY OF THE INVENTION

The present invention has been developed in response to the present state of the art, and in particular, in response to the problems and needs in the art that have not yet been fully solved by currently available noise reduction devices. Accordingly, the present invention has been developed to provide a noise reduction device.

In one embodiment, there may be a noise reduction device for use with a strap. The noise reduction device may include a securing member and a damping member. The securing member may be configured to removably attach the noise reduction device to the strap. The damping member may be coupled to the securing member and may be configured to dampen motion.

The damping member may include a multiplicity of strands. There may be a internal coupling member that may be coupled to the securing member and to the damping member and may be configured to couple the securing member to the damping member. The securing member may include a strip of material extending from the damping member and may be configured to wrap tightly about the strap and removably attach to itself.

In one embodiment, the securing member may include a first surface including loop material and a second surface including hook material. There may be an internal coupling member coupled to the securing member and about the multiplicity of strands, wherein the internal coupling member may be configured to couple the securing member to the damping member. There may also be an annular reinforcing member coupled to the securing member, wherein the annular reinforcing member may be positioned within a hole extending through the securing member, and wherein the internal coupling member may extend through the hole and through the annular reinforcing member.

In one embodiment, the multiplicity of strands may be yarn. It may be that the securing member includes a wire and/or a rubber casing that may substantially envelop the wire. The securing member may include a lock that may be configured to prevent removal of the securing member from a strap without an appropriate key.

The damping member may include a solid core and may include a multiplicity of rubber strands that may extend from the solid core. The damping member may include a sponge. The damping member may include a plurality of branching strands. The damping member may include a first plurality of strands of a first length and may include a second plurality of strands of a second length. The first length may be shorter than the second length.

In one embodiment, there may be a noise reduction device for reducing noise from a vibrating strap. The noise reduction device may include a securing member, a damping member, and an internal coupling member. The securing member may be configured to removably attach to the vibrating strap. The damping member may be configured to dampen vibratory motion. The internal coupling member may be configured to couple the securing member to the damping member.

The damping member may include a multiplicity of fibers. The securing member may include a pair of deformable tabs configured to bend about the strap. The internal coupling member may include a plastic strip. The damping member may include a plurality of leaf-shaped members.

In one embodiment, there may be a noise reduction device for reducing noise from a vibrating strap. The noise reduction device may include a securing member, a damping member, and an internal coupling member. The securing member may include a strip of material having a first surface including hook material and a second surface including loop material, wherein the securing member may be configured to removably attach to the vibrating strap by wrapping about the strap and attaching a portion of the first surface to a portion of the second surface. The damping member may include a plurality of strands of fibers configured to dampen vibratory motion. The internal coupling member may be configured to couple the securing member to the damping member and may be configured to bundle the plurality of strands of fibers.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
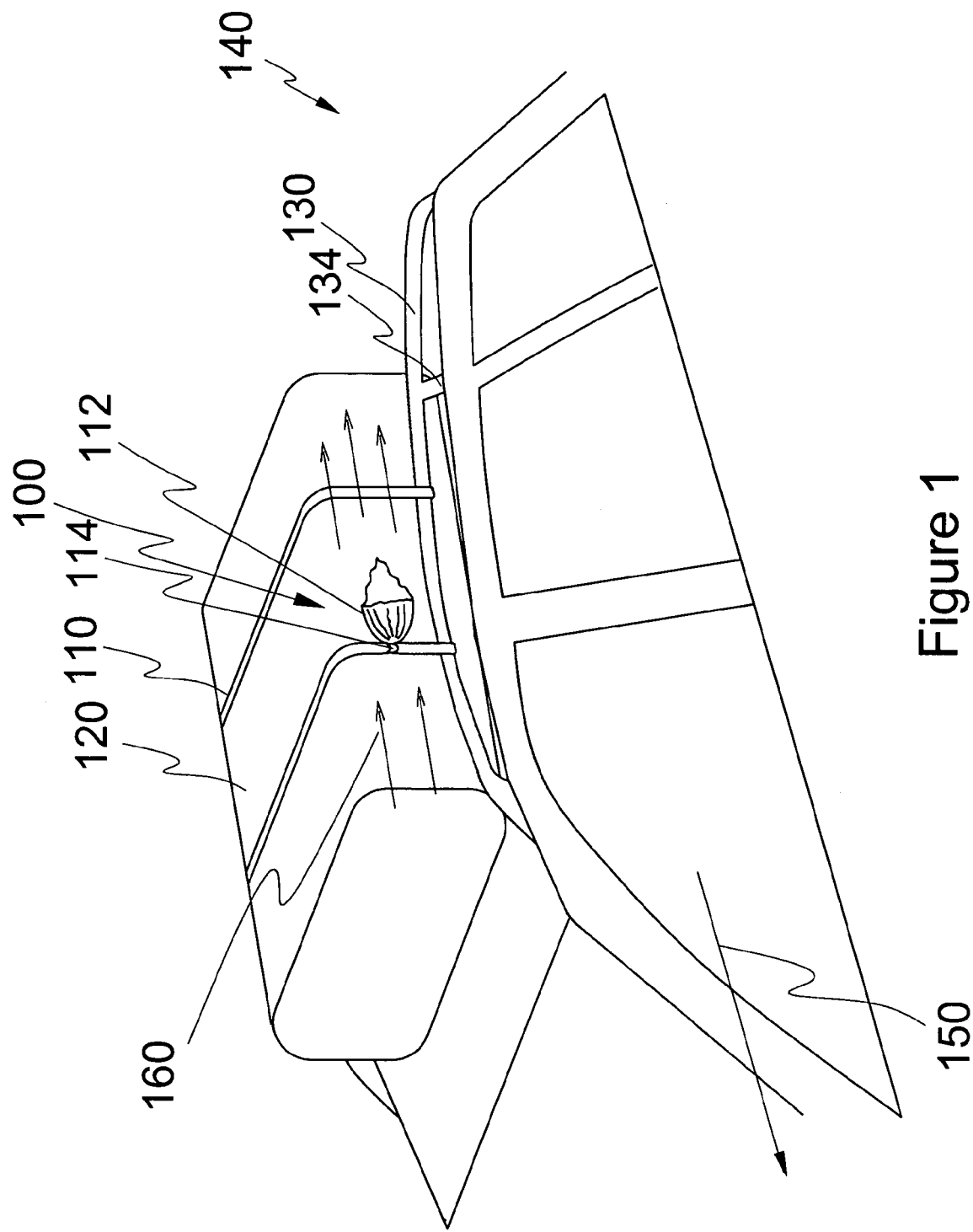
FIG. 1 illustrates a top plan view of a noise reduction device attached to a strap according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

FIG. 1 illustrates a top plan view of a noise reduction device 100 attached to a strap 110 according to one embodiment of the invention. The noise reduction device may include a damping member 112 and a securing member 114. The damping member 112 may be configured to dampen oscillatory motion. The securing member 114 may be configured to physically couple the damping member 112 to an object such as a strap 110. Preferably, the damping member 112 is coupled to the object by the securing member 114 with sufficient direct physical contact and/or rigidity of connection that kinetic energy may be shared between the object and the damping member 112 at least sufficient such that kinetic energy may transfer from the object to the damping member 112.

The illustrated embodiment shows a damping member 112 that is a tuft of fibers. There is also shown a securing member 114 that is a strip of material configured to enwrap a strap 110. The shown strap 110 is configured to couple luggage 120 to a luggage rack or rail 130 that is coupled to a car 140. Further shown is a spacing member 134 connecting and supporting the luggage rack 130 to and above the car 140. The illustrated car 140 is traveling in a direction shown by arrow 150, thereby causing air to travel in a direction relative to the noise reduction device 100, strap 110, luggage 120, and luggage rack 130, as shown by arrows 160.

As air traverses the strap 110, the strap 110 may be set in motion. This is especially likely wherein the strap 110 may be tautly coupled to the luggage 120 and wherein there may be one or more portions of the strap 110 at a distance from any rigid objects, as is typically the case when a strap 110 is used to secure luggage 120 to the roof of a vehicle 140. Under such circumstances, it is typical for a strap 110 to experience oscillations, not unlike strings of musical instruments. However, the sounds produced by an oscillating luggage strap 110 are typically unpleasant, distracting, loud, and/or undesired.

In operation, the noise reduction device 100 is coupled to the strap 110 by the securing member 114. Significant motion of the strap exerts a force on the noise reduction device 100. The damping member 112 of the noise reduction device 100 resists motion. Therefore, as a strap 110 may tend to move and/or oscillate, the damping member 112 of the noise reduction device 100 may hinder movement of the strap 110. This hindrance may be particularly effective against oscillatory motion, a significant source of noise. Also, a noise reduction device may reduce wear on a strap caused by oscillatory motion. Additionally, a noise reduction device may substantially alter aerodynamic resistance caused by oscillator motion, thereby reducing drag and increasing gas mileage.

Where a strap 110 may not be drawn sufficiently taut to stop slapping, rattling, thudding, or other noises caused by impact, the noise reduction device 100 may also prevent undesired sounds. The damping member 112 of the noise reduction device 100 may hinder motion of the strap 110 such that a strap 110 may be prevented from impacting another solid object, thereby preventing sounds that may be otherwise produced by the strap 110.

Figure 2:
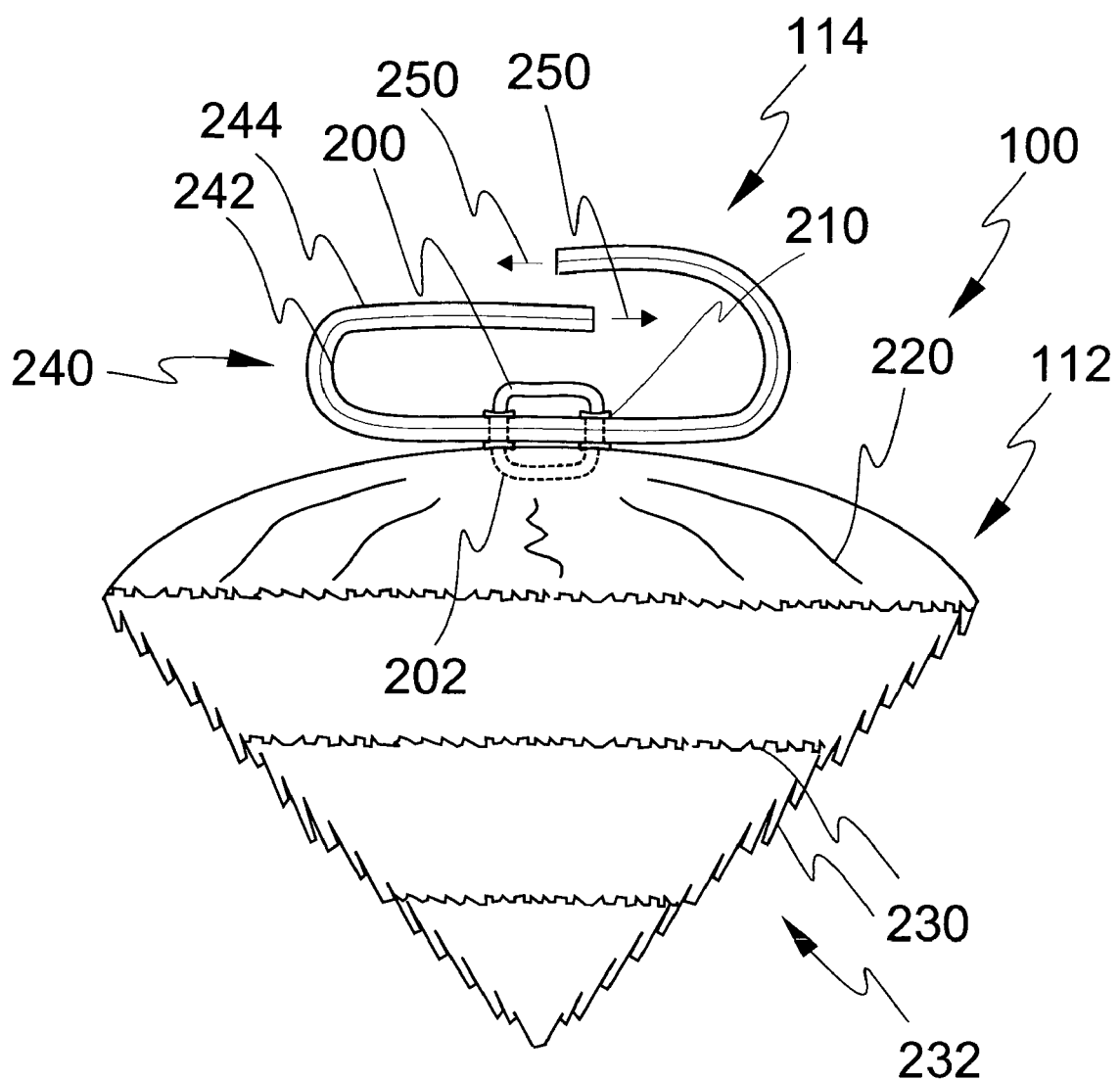
FIG. 2 illustrates a side plan view of a noise reduction device according to one embodiment of the invention.
Figure 3:
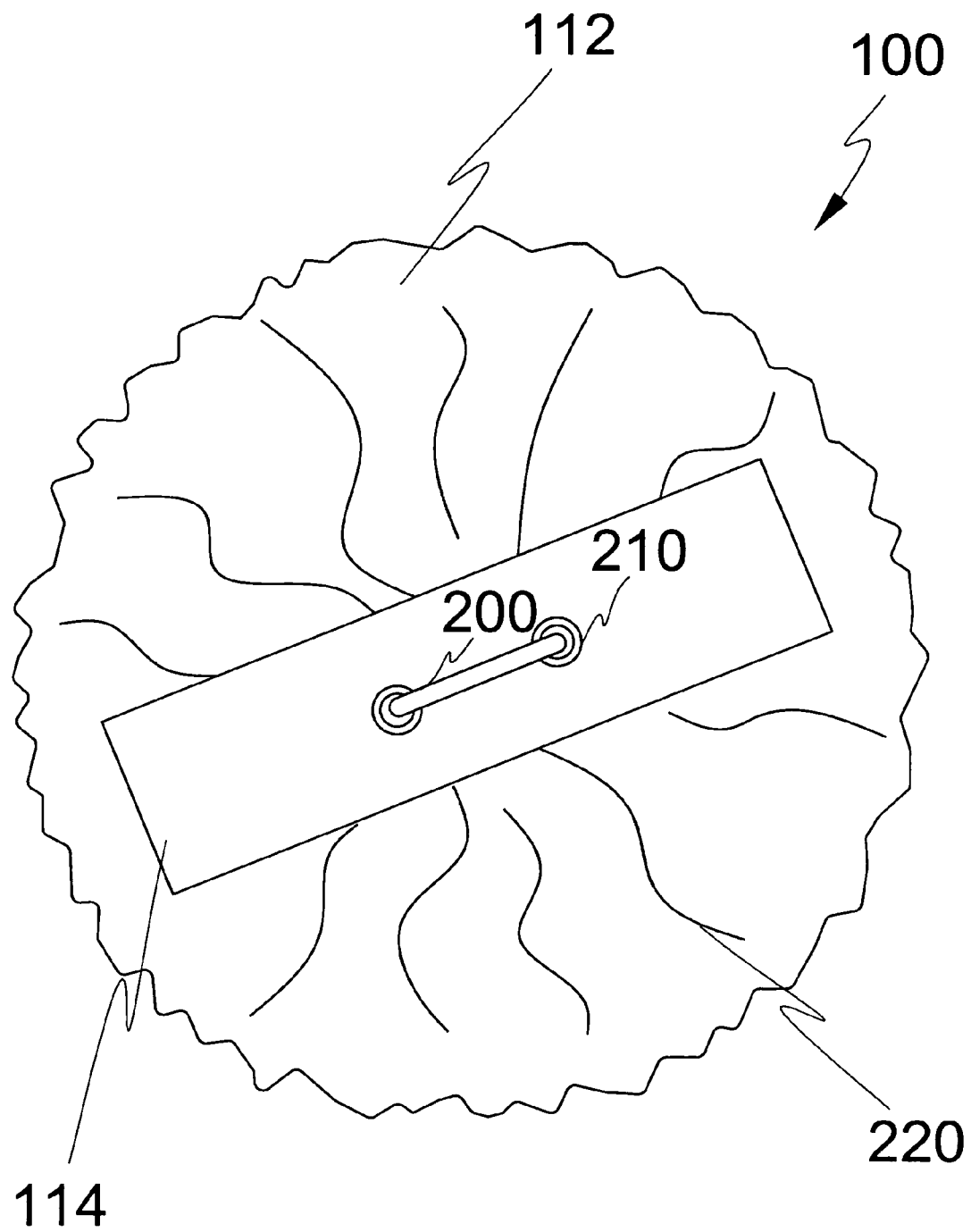
FIG. 3 illustrates a top plan view of a noise reduction device according to one embodiment of the invention.

Turning to FIGS. 2 and 3, there is shown a side plan view and a top plan view of a noise reduction device 100, respectively according to one embodiment of the invention. There is shown a damping member 112 coupled to a securing member 114 by an internal coupling member 200. The shown internal coupling member 200 extends through the damping member at dashed lines 202, thereby enwrapping the fibers of the damping member 112. The internal coupling member 200 also extends through the securing member through one or more eyelets, grommets, or other annular reinforcing members 210. Thereby the internal coupling member or annular retaining member 200 may preferably firmly attach the securing member 114 to the damping member 112.

The damping member 112 may include materials and/or structures configured to have a different resistance to movement from a strap 110. The damping member 112 may include a plurality or multiplicity of strands 220, preferably being strands of yarn. The strands 220 may be frictionally bound together and/or to the noise reduction device 100 by an internal coupling member 200 at dashed lines 202. The strands 220 may extend through an annular portion 202 of an internal coupling member 200 and may be attached thereto generally at a middle portion of each strand 220. Thereby, the strands 220 may dangle from the noise reduction device 100, forming a general pom-pom shape and/or structure wherein ends 230 of the strands 220 may be exposed at an underside 232 of the noise reduction device 100.

The securing member 114 may include structure and/or material configured to couple the noise reduction device 100 to a strap. The strap could be attached directly to the roof of the car, across the bed of a truck, etc. The securing member 114 may be a generally rectangular strip of material that may be configured to form a loop. There may be a first surface 242 and a second surface 244. The first and second surfaces 242 and 244 may be of hook and loop material, such that the first surface 242 may removably couple to the second surface 244 when brought together such as suggested by arrows 250. Thereby, a user may tightly couple the noise reduction device 100 to a strap within a range of strap sizes. Preferably the first surface 242 is hook and the second surface 244 is loop, thereby reducing the likelihood that materials other than the securing member 114, for example strands of yarn having structure similar to that of a loop surface, may attach to the securing member 114. In FIG. 3, the securing member 114 is illustrated to be generally open and flat.

It is understood that the above-described preferred embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the figures show a pom-pom like damping member, the damping member is not restricted to a plurality of bound single strands. There may be a plurality of bound leaf shaped members. A leaf-shaped member may be generally flat and may be wider in a middle than at one or more end. There may be a plurality of bound branching strands. There may be a plurality of strands extending from a solid core, for example rubber strands extending from a solid rubber core. There may be a plurality of single strands having a variety of lengths. There may be a variety of strands, such as materials and/or shapes varying from strand to strand or varying within a single strand. There may be a damping member that includes one or more sponge-like portions. There may be a damping member that includes one or more spring-like portions that may be damped springs. There may be a damping member that may include one or more fluid containing members that may be bags having a viscous fluid therein. There may be a damping member including a combination of two or more of the members and/or structures described herein.

Additionally, although the figures illustrate a securing member that is a two-sided hook and loop strip, the securing member is not restricted to such. There may be a securing member that is a string that may be tied. There may be a securing member that may be a strip of material including one or more snaps, buttons, or other coupling devices. There may be a securing member that may be a wire configured to be wrapped about a strap. There may be a securing member that may be a wire encased in a rubber casing wherein the wire and rubber casing may be configured to wrap about a strap. There may be a securing member that may include a sharp and/or rigid member configured to pierce a strap and attach thereby, such as a safety pin. There may be a locking securing member. There may be a securing member that may include foldable tabs that may be metal, wherein the tabs may include one or more hinges. There may be a securing member that may include a pressure sensitive adhesive. There may be a securing member that may include a hook. There may be a securing member with an adjustable size. There may be a securing member including an adjustable portion configured to provide an adjustable coupling strength. There may be a securing member including a variety of two or more members and/or structures and/or including two or more properties described herein.

It is also envisioned that an internal coupling member may be present in one embodiment or may be not present in one embodiment. An internal coupling member may be of any type of coupling member described herein and/or known in the art. An internal coupling member may include an adhesive, a glue, a retaining member such as a wire, a strip, tie wrap, cable tie, and/or knotting device.

It is additionally envisioned that a noise reduction device may include a plurality of noise reduction devices that may be attached in series to a strap and/or may be attached in parallel to a strap. For example, a noise reduction device may include a secondary coupling device that may be configured to couple to one or more other noise reduction devices, thereby altering a size and/or shape of a noise reduction device. Thereby a plurality of noise reduction devices may be combined for enhanced noise reduction properties.

Finally, it is envisioned that the components of the device may be constructed of a variety of materials. Any of the members, including but not limited to a securing member, an internal coupling member, and a damping member, may be constructed including one or more of the following materials and/or properties of materials: plastic, ceramic, rubber, polymer, resin, wood, metal, liquid, gas, solid, composite, fiber, natural fiber, and woven material.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:

1. A noise reduction device for use with a strap, comprising:
   a securing member configured to removably attach the noise reduction device to the strap, including:
      a strip of material having a first surface and a second surface, wherein the first and second surface comprise mating hook and loon material such that the strip forms a loon when coupled to itself; and
      a pair of grommets extending through a pair of apertures disposed through the strip of material;
   an annular retaining member extending through the pair of grommets; and
   a damping member, comprising a tuft of fibers, coupled to the securing member, and configured to dampen motion, wherein the tuft of fibers are frictionally coupled to the annular retaining member and thereby coupled to the securing member.

2. The noise reduction device of claim 1, wherein the damping member comprises a multiplicity of strands joined together in a tuft-like formation.

3. The noise reduction device of claim 2, wherein at least one of the multiplicity of strands comprises yarn.

4. The noise reduction device of claim 1, wherein the securing member comprises:
   a wire; and
   a rubber casing substantially enveloping the wire.

5. The noise reduction device of claim 1, wherein the securing member comprises a lock configured to prevent removal of the securing member from the strap without an appropriate key.

6. The noise reduction device of claim 2, wherein the damping member further comprises:
   a solid core; and
   a multiplicity of rubber strands extending from the solid core.

7. The noise reduction device of claim 1, wherein the damping member comprises a sponge.

8. The noise reduction device of claim 1, wherein the damping member comprises a branching strand.

9. The noise reduction device of claim 1, wherein the damping member comprises:
   a first plurality of strands of a first length; and
   a second plurality of strands of a second length, wherein the first length is shorter than the second length.

10. A noise reduction device for reducing noise from a vibrating strap, comprising:
    a securing member configured to removably attach to the vibrating strap, including:
       a strip of material having a first surface and a second surface, wherein the first and second surface comprise mating hook and loop material such that the strip forms a loop when coupled to itself; and
       a pair of annular reinforcing members extending through a pair of apertures disposed through the strip;
    a damping member, comprising a tuft of fibers configured to dampen vibratory motion of the strap;
    an internal coupling member extending through the pair of grommets; and
    an internal coupling member extending through the string of material configured to couple the securing member to the damping member.

11. The noise reduction device of claim 10, wherein the strip of material of the securing member comprises a pair of deformable tabs configured to bend about the strap.

12. The noise reduction device of claim 10, wherein the internal coupling member comprises a plastic strip.

13. The noise reduction device of claim 10, wherein the clamping member comprises a plurality of leaf-shaped members, being joined together in a tuft-like formation.

14. A noise reduction device for reducing noise from a vibrating strap, comprising:
    a securing member including a strip of material having a first surface including hook material and a second surface including loop material, wherein the securing member is configured to removably attach to the vibrating strap by wrapping about the strap and attaching a portion of the first surface to a portion of the second surface; and a pair of grommets extending through a pair of apertures disposed through the strip of material;
    a damping member including a plurality of strands of fibers defining a tuft-like formation, configured to dampen vibratory motion of the strap; and
    an annular retaining member configured to couple the securing member to the damping member and configured to bundle the plurality of strands of fibers in the tuft-like formation.

* * * * *